United States Patent [19]
Greenwood et al.

[11] Patent Number: 6,053,144
[45] Date of Patent: Apr. 25, 2000

[54] DIESEL ENGINE WITH A COMBUSTOR WHICH PROVIDES COMBUSTION PRODUCTS TO REDUCE $NO_x$ PRODUCTION IN A COMBUSTION CHAMBER

[75] Inventors: Stuart A. Greenwood, San Diego, Calif.; Eric C. Fluga, Dunlap, Ill.

[73] Assignee: Caterpillar Inc., Peoria, Ill.

[21] Appl. No.: 09/187,053

[22] Filed: Nov. 5, 1998

[51] Int. Cl.[7] ........................................ F02B 3/00
[52] U.S. Cl. ............................. 123/294; 123/551
[58] Field of Search ................. 123/551, 294, 123/305, 3, 556, 552, 142.5 R

[56] References Cited

U.S. PATENT DOCUMENTS

| | | | |
|---|---|---|---|
| 3,024,777 | 3/1962 | Baker | 123/122 |
| 3,630,183 | 12/1971 | Hoffman | 123/122 G |
| 3,894,392 | 7/1975 | Melchior | 60/599 |
| 4,004,414 | 1/1977 | Melchior et al. | 60/39.65 |
| 4,096,697 | 6/1978 | Treuil | 60/599 |
| 4,122,679 | 10/1978 | Charron | 60/599 |
| 4,131,086 | 12/1978 | Noguchi | 123/3 |
| 4,215,550 | 8/1980 | Dinger et al. | 60/606 |
| 4,539,815 | 9/1985 | Garcea | 60/599 |
| 4,625,910 | 12/1986 | Kawamura | 237/2 A |
| 4,936,097 | 6/1990 | Rodgers | 60/606 |
| 5,018,354 | 5/1991 | Melchior et al. | 60/606 |
| 5,094,198 | 3/1992 | Trotta et al. | 123/179.21 |
| 5,410,873 | 5/1995 | Tashiro | 60/274 |
| 5,823,170 | 10/1998 | Sienicki | 123/551 |

*Primary Examiner*—Thomas N. Moulis
*Assistant Examiner*—Mahmoud M. Gimie
*Attorney, Agent, or Firm*—Maginot, Addison & Moore

[57] ABSTRACT

A method of operating a diesel engine assembly having a combustion chamber is disclosed. The method includes the step of determining a desired level of $NO_x$ for exhaust gases exiting the combustion chamber and generating a fuel control signal in response thereto. The method further includes the steps of injecting an amount of combustor fuel into a combustor based on the fuel control signal and combusting the amount of combustor fuel in the combustor so as to produce combustion products. The method yet further includes the steps of advancing the combustion products into the combustion chamber during an intake stoke of the diesel engine and injecting diesel fuel with a fuel injector into the combustion chamber while the combustion products are located in the combustion chamber during a compression stroke. The method still further includes the step of combusting a mixture of the diesel fuel and the combustion products so as to produce exhaust gases during a power stroke. An engine assembly is also disclosed.

16 Claims, 2 Drawing Sheets

US 6,053,144

DIESEL ENGINE WITH A COMBUSTOR WHICH PROVIDES COMBUSTION PRODUCTS TO REDUCE $NO_x$ PRODUCTION IN A COMBUSTION CHAMBER

TECHNICAL FIELD OF THE INVENTION

The present invention relates generally to a diesel engine, and more specifically diesel engine with a combustor which provides combustion products to reduce $NO_x$ production in a combustion chamber.

BACKGROUND OF THE INVENTION

During operation of an internal combustion engine, it is desirable to control the formation and emission of certain gases, such as the oxides of nitrogen ($NO_x$). One method of achieving this result is the use of exhaust gas recirculation (EGR) which is a process whereby exhaust gases are selectively routed from the exhaust manifold to the intake manifold of the internal combustion engine. The use of EGR reduces the amount of $NO_x$ produced in a combustion chamber of the internal combustion engine. In particular, $NO_x$ is produced when nitrogen and oxygen are combined at high temperatures associated with combustion. The presence of chemically inert gases, such as exhaust gases, in the combustion chamber reduces temperature and inhibits nitrogen atoms from bonding with oxygen atoms in the combustion chamber thereby reducing $NO_x$ production.

A drawback with using EGR on a turbocharged diesel engine is that EGR cannot be used under conditions where the average pressure of air in the intake manifold is greater than the average pressure of exhaust gases in the exhaust manifold. Using EGR under these conditions would result in a net flow of air from the intake manifold to the exhaust manifold, rather than a net flow of exhaust gases from the exhaust manifold to the intake manifold needed to reduce $NO_x$ production. Therefore, an alternative method of supplying exhaust gases to the intake manifold must be used when the pressure in the intake manifold is greater than the pressure in the exhaust manifold.

Another disadvantage to using EGR is that the combustion products in the exhaust manifold contain a large amount of contaminants, such as soot and smoke. In particular, the intermittent combustion of fuel in reciprocating engines produces a large amount of soot and smoke. Recirculating this soot and smoke can foul the intake manifold, combustion chamber, and the valves and conduits necessary to recirculate the exhaust gas. Such fouling can potentially degrade the performance and usable life of the diesel engine.

What is needed therefore is an apparatus and method for advancing combustion products to the combustion chamber of a diesel engine which overcome one or more of the above-mentioned drawbacks.

DISCLOSURE OF THE INVENTION

In accordance with a first embodiment of the present invention, there is provided a method of operating a diesel engine assembly having a combustion chamber. The method includes the step of determining a desired level of $NO_x$ for exhaust gases exiting the combustion chamber and generating a fuel control signal in response thereto. The method further includes the steps of injecting an amount of combustor fuel into a combustor based on the fuel control signal and combusting the amount of combustor fuel in the combustor so as to produce combustion products. The method yet further includes the steps of advancing the combustion products into the combustion chamber during an intake stroke of the diesel engine and injecting diesel fuel with a fuel injector into the combustion chamber while the combustion products are located in the combustion chamber during a compression stroke. The method still further includes the step of combusting a mixture of the diesel fuel and the combustion products so as to produce exhaust gases during a power stroke.

In accordance with a second embodiment of the present invention, there is provided an engine assembly having a combustion chamber defined therein. The engine assembly includes a controller which determines a desired level of $NO_x$ for exhaust gases exiting said combustion chamber and generates a fuel control signal in response thereto. The engine assembly further includes a combustor operable to combust an amount of combustor fuel to produce combustion products in response to generation of said fuel control signal. The combustion products are advanced to said combustion chamber during an intake stroke of the engine assembly. The engine assembly further includes a fuel injector operable to inject diesel fuel into said combustion chamber during a compression stroke of said engine assembly. A mixture of said diesel fuel and said combustion products is combusted within said combustion chamber during a power stroke whereby exhaust gases are produced.

BEST MODE FOR CARRYING OUT THE INVENTION

Figure 1:
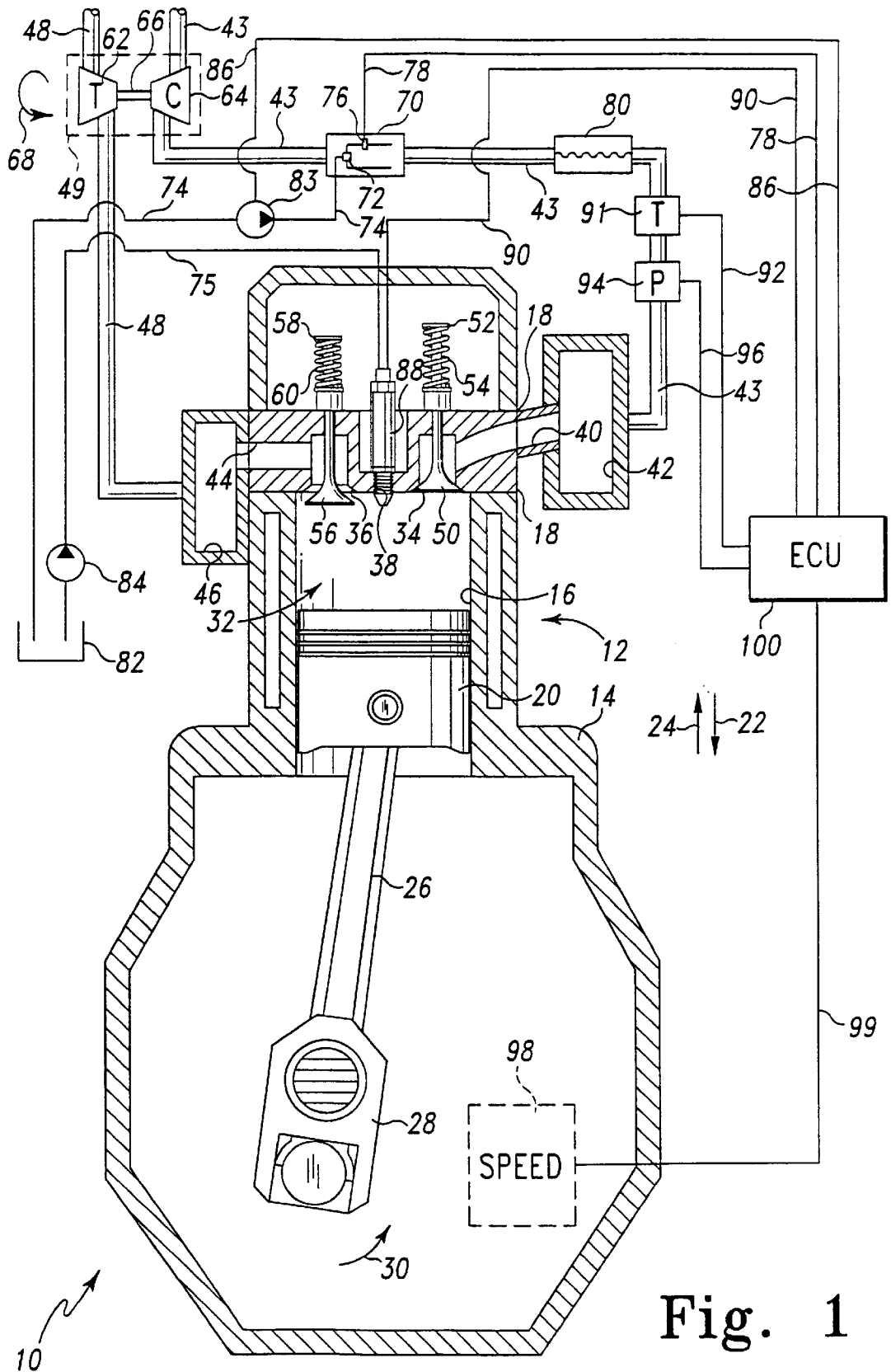
FIG. 1 is a partial cross sectional, partial schematic view of a turbocharged diesel engine which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a diesel engine assembly 10. The engine assembly 10 includes a cylinder assembly 12. The cylinder assembly 12 includes an engine block 14 having a piston cylinder 16 defined therein. An engine head 18 is secured to an upper portion of the engine block 14. The cylinder assembly 12 further includes a piston 20 which translates in the piston cylinder 16 in the general direction of arrows 22 and 24. As the piston 20 moves downwardly in the general direction of arrow 22 to the position shown in FIG. 1, a connecting rod 26 secured to the piston 20 urges a crankshaft 28 to rotate in the general direction of arrow 30. Subsequently, as the crankshaft 28 continues to rotate in the general direction of arrow 30, the crankshaft 28 urges the connecting rod 26 and the piston 20 in the general direction of arrow 24 to return the piston 20 to an uppermost position (not shown).

The piston 20, the piston cylinder 16, and the engine head 18 cooperate so as to define a combustion chamber 32. In particular, when the piston 20 is advanced in the general direction of arrow 24, the volume of the combustion chamber 32 is decreased. On the other hand, when the piston 20 is advanced in the general direction of arrow 22, the volume of the combustion chamber 32 is increased as shown in FIG. 1.

The engine head 18 has an intake port 34, an exhaust port 36, and a fuel injector opening 38 defined therein. Each of the intake port 34, exhaust port 36, and fuel injector opening 38 are in fluid communication with the combustion chamber 32.

An intake passage 40 places the intake port 34 in fluid communication with an intake manifold 42. Air is advanced into the intake manifold 42 from an intake conduit 43 prior to being advanced to the intake passage 40. Similarly, an exhaust passage 44 places the exhaust port 36 in fluid communication with an exhaust manifold 46. An exhaust conduit 48 in fluid communication with the exhaust manifold 46 allows exhaust gases to advance from the exhaust manifold 46 to a turbocharger 49 prior to advancing to the atmosphere.

The turbocharger 49 includes a turbine portion 62 and a compressor portion 64. High pressure exhaust gases in the exhaust conduit 48 pass through the turbine portion 62 and cause a shaft 66 to rotate in the general direction of arrow 68. The rotation of the shaft 66 drives the compressor portion 64 of the turbocharger 49 so as to increase the pressure of the air in the intake conduit 43. It should be appreciated that during operation of the engine assembly 10, passing air in the intake conduit 43 through the compressor portion 64 can cause the pressure of air in the intake conduit 43 to be greater than the pressure of exhaust gases in the exhaust conduit 48.

When the pressure of the air in the intake conduit 43 is greater than the pressure of air in the exhaust conduit 48, conventional exhaust gas recirculation (EGR) systems, which simply place the intake conduit 43 in fluid communication with the exhaust conduit 48, cannot advance exhaust gases from the exhaust conduit 48 to the intake conduit 43. In fact, it is likely that air from the intake conduit 43 would be advanced to the exhaust conduit 48 thereby decreasing the efficiency of the engine assembly 10 as well as failing to provide exhaust gases to the intake conduit 43.

The engine assembly 10 further includes a combustor 70 positioned in the intake conduit 43 between the compressor portion 64 of the turbocharger 49 and the intake manifold 42. The combustor 70 is operable to burn a quantity of combustor fuel in order to provide combustion products to the combustion chamber 32. Preferably, the combustor fuel is diesel fuel. However, the combustor fuel could be any one of a number of fuels such as gasoline, methane, natural gas or other hydrocarbon fuel. The combustor 70 includes a nozzle 72 which mixes the combustor fuel from a fuel line 74 with air in the intake conduit 43 to form a combustible mixture in the combustor 70.

Because the combustor fuel cannot spontaneously combust in the combustor 70, an ignition source, such as the ignitor 76, provides a spark which ignites the mixture of combustor fuel and air in the combustor 70. In order to provide combustion products to the combustion chamber 32, combustor fuel is provided to the nozzle 72 via the fuel line 74 and the ignitor 76 creates a spark which ignites the mixture of combustor fuel and air in the combustor 70. It should be appreciated that combustion products produced by the combustor 70 contain less smoke and particulates than the exhaust gases present in the exhaust conduit 48. In particular, the continuous combustion of fuel in the combustor 70 produces less soot and smoke than the intermittent combustion in the combustion chamber 32. Therefore, the combustion products advanced from the combustor 70 to the combustion chamber 32 are cleaner than exhaust gases present in the exhaust conduit 48 that are used by conventional EGR systems.

The engine assembly 10 further includes a heat exchanger 80 positioned in the intake conduit 43 between the combustor 70 and the intake manifold 43. It should be appreciated that compressing air in the compressor portion 64 increases the temperature of air in the intake manifold 43. It should further be appreciated that burning combustor fuel in the combustor 70 further increases the temperature of air in the intake conduit 43. Increasing the temperature of air that enters the combustion chamber 32 adversely effects the efficiency of the engine assembly 10. Therefore, the heat exchanger 80 passes cool air or water around the intake conduit 43 to cool the air in the intake conduit 43. This cooled air is then advanced from the heat exchanger 80 to the combustion chamber 32 via the intake conduit 43, intake manifold 42, intake passage 40, and intake opening 34.

An intake valve 50 selectively places the intake conduit 43 in fluid communication with the combustion chamber 32. When the intake valve 50 is placed in the open position (not shown), air is advanced from the intake conduit 43 to the combustion chamber 32 via the intake manifold 42, the intake passage 40, and the intake port 34. When the intake valve 50 is placed in the closed position (shown in FIG. 1), air is prevented from advancing from the intake conduit 43 to the combustion chamber 32 since the intake valve 50 blocks fluid flow through the intake port 34. In addition, an intake valve spring 54 is interposed between the engine head 18 and a cap 52 on the upper end of the intake valve 50. The intake valve spring 54 applies a bias force to a cap 52 which urges the intake valve 50 in the general direction of arrow 24 so as to place the intake valve 50 in the closed position. The intake valve 50 is actuated in a known manner by a camshaft (not shown), pushrods (not shown), and rocker arm (not shown) which urges the cap 52 of the intake valve 50 in the general direction of arrow 22 to move the intake valve 50 between the closed position and the open position.

An exhaust valve 56 selectively places the exhaust conduit 48 in fluid communication with the combustion chamber 32. When the exhaust valve 56 is placed in the open position (shown in FIG. 1), gases are advanced from the combustion chamber 32 to the exhaust conduit 48 via the exhaust port 36, the exhaust passage 44, and the exhaust manifold 46. When the exhaust valve 56 is placed in the closed position (not shown), exhaust gases are prevented from advancing from the combustion chamber 32 to the exhaust conduit 48 since the exhaust valve 56 blocks fluid flow through the exhaust port 36. In addition, an exhaust valve spring 60 is interposed between the engine head 18 and a cap 58 on the upper end of the exhaust valve 56. The exhaust valve spring 60 applies a bias force to a cap 58 which urges the exhaust valve 56 in the general direction of arrow 24 so as to place the exhaust valve 56 in the closed position. The exhaust valve 56 is actuated in a known manner by a camshaft (not shown), pushrods (not shown), and rocker arm (not shown) which urges the cap 58 of the exhaust valve 56 in the general direction of arrow 22 to move the exhaust valve 56 between the closed position and the open position.

The engine assembly 10 further includes a fuel reservoir 82, a first fuel pump 83, and a second fuel pump 84. The first fuel pump 83 selectively advances low pressure combustor fuel from the fuel reservoir 82 to the nozzle 72 of the combustor 70. In particular, the first fuel pump 83 injects an amount of combustor fuel in the combustor 70 based on a fuel control signal recieved via a signal line 86. It should be appreciated that the fuel control signals allow combustor fuel to be injected into the combustor 70 at various flow rates or in a series of pulses which allow a precise amount of combustor fuel to be injected into the combustor 70.

The second fuel pump 84 supplies pressurized diesel fuel to the fuel injector 88 via a fuel line 75. The fuel injector 88 is positioned in the fuel injector opening 38 of the engine head 18 and is operable to receive fuel injector control signals via the signal line 90 and inject a quantity of diesel fuel from the fuel line 75 to the combustion chamber 32 in response thereto.

It should further be appreciated the fuel reservoir 82 supplies diesel fuel to both the first fuel pump 83 and the second fuel pump 84. Therefore, the combustor fuel is diesel fuel. However, a separate fuel reservoir may be provided to store combustor fuel separately from diesel fuel if it is desired to combust a combustor fuel that is different from diesel fuel.

The engine assembly 10 further includes a temperature sensor 91. The temperature sensor 91 is positioned in the intake conduit 43. The temperature sensor 91 is operable to measure temperature associated with the intake conduit 43 and generate temperature signals on a signal line 92 in response thereto. In addition, during cold operating conditions if the temperature is below a predetermined cold start threshold level, a cold startup signal is generated on the signal line 92.

The engine assembly 10 further includes a pressure sensor 94. The pressure sensor 94 is positioned in the intake conduit 43. The pressure sensor 86 is operable to measure pressure associated with the intake conduit 43 and generate pressure signals on a signal line 96 in response thereto.

The engine assembly 10 further includes a speed sensor 98 which measures the speed of the crankshaft 28. The speed sensor 98 measures the speed of the crankshaft 28 and generates a speed signal on the signal line 99 in response thereto.

The engine assembly 10 further includes a controller or engine control unit 100. The engine control unit 100 is operable to calculate a mass flow $\dot{m}$ through the engine assembly 10. In order to calculate the mass flow $\dot{m}$ through the engine, the volumetric flow V must first be calculated. The volumetric flow V through the engine assembly 10 can be calculated with the following equation:

$$V = RPM * Displacement/2 * \eta$$

where V is the volumetric flow through the engine, RPM is the speed of the engine calculated from the speed signal received on signal line 99, the displacement is based on the number of cylinders, diameter of the piston cylinder 16, and length of the stroke of the piston 20 in the general direction of arrows 22 and 24, and $\eta$ is the volumetric efficiency of the engine. The volumetric efficiency $\eta$ is a measure of how efficiently air is pumped through the engine. The mass flow through engine is then further calculated by applying the ideal gas law. From the volumetric flow, the mass flow $\dot{m}$ through the engine can then be calculated with the following equation:

$$\dot{m} = PV/RT$$

where $\dot{m}$ is the mass flow through the engine, P is the pressure in the intake conduit 43 determined from the pressure signal recieved via the signal line 96, V is the volumetric flow calculated above, T is the temperature in the intake conduit 43 determined from the temperature signal recieved via the signal line 92, and R is the ideal gas constant.

Mass flow $\dot{m}$ can be expressed as a percentage of the maximum load that the engine assembly can handle at a certain speed. Therefore, 100% load corresponds to the maximum mass flow for a given operating speed, and 50% load corresponds to one half of the maximum mass flow through the engine at a certain speed.

Figure 2:
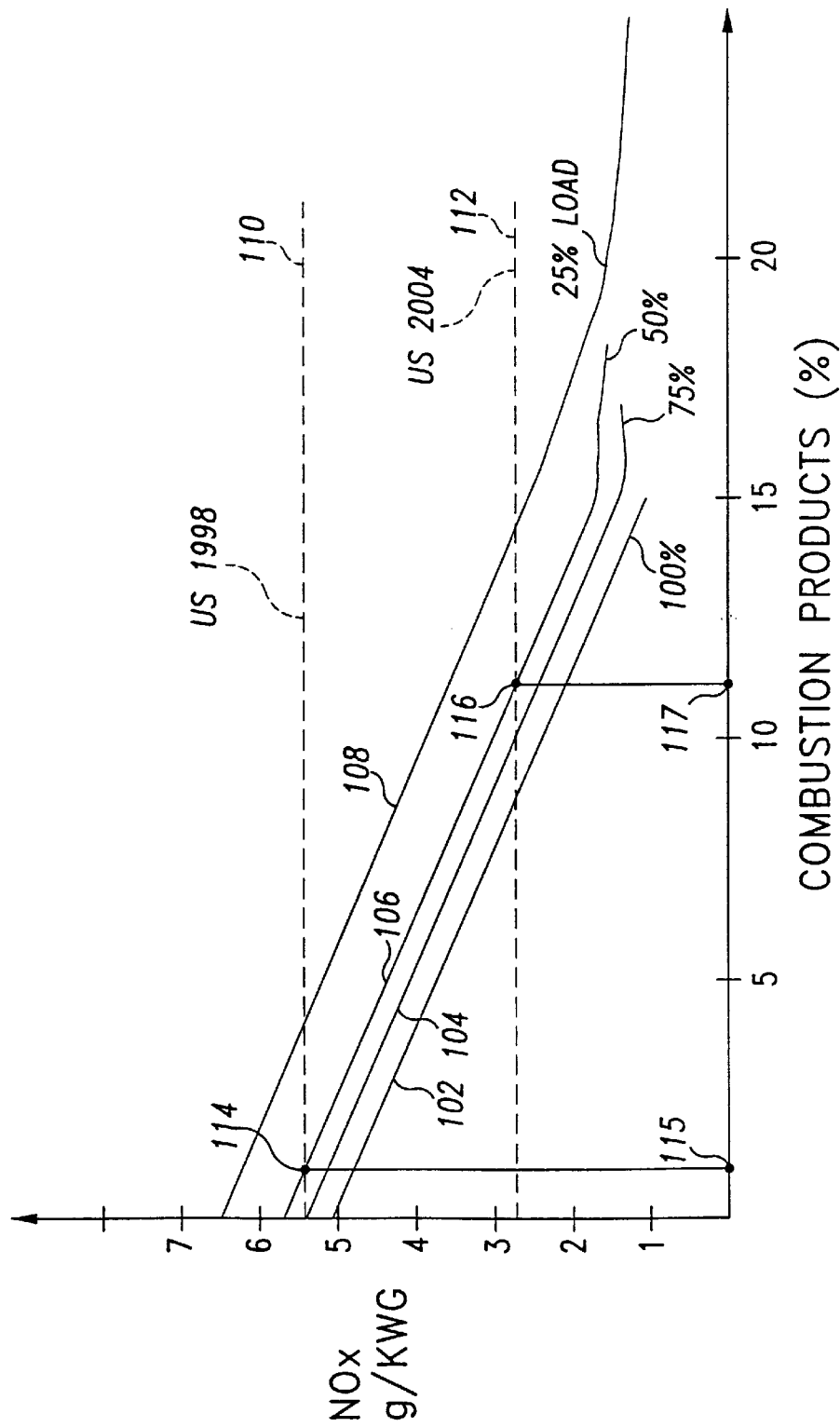
FIG. 2 is a graph which illustrates the variation in $NO_x$ production with different levels of combustion products in the intake conduit.

Referring now to FIG. 2, there is shown the relationship between the amount of combustion products provided by the combustor 70 (as a percentage of flow in the intake conduit 43) and the level of $NO_x$ in the exhaust gases exiting the combustion chamber 32. It should be noted that FIG. 2 corresponds to operating an exemplary engine at 1700 RPM and provides $NO_x$ levels at 100%, 75%, 50% and 25% illustrated by lines 102, 104, 106 and 108 respectively. The $NO_x$ levels are experimentally determined prior to operation of the engine assembly 10. Once the desired $NO_x$ level is determined, the amount of combustion products required as a percentage of flow in the intake conduit 43 can be determined. The relationship between engine speed, engine load and $NO_x$ production is predetermined for each engine speed and load condition.

For example, a line 110 represents the United States on highway $NO_x$ standard for the year 1998, and a line 112 represents the United States on highway $NO_x$ standard for the year 2004. Such standards also exist for off highway use and marine use and vary from country to country. Therefore, if it is determined that the engine assembly 10 operating at 50% load at 1700 RPM and it is desired to meet the 1998 United States on highway standard, then the desired combustion products percentage corresponds to the point 115, or about 1%. On the other hand, if it is determined that the engine assembly 10 operating at 50% load and it is desired to meet the 2004 United States on highway standard, then the desired combustion products percentage corresponds to the point 117, or about 11.5%

Once the engine control unit 100 determines the percentage of combustion products required in the intake conduit 43, the engine control unit 100 generates a fuel control signal on the signal line 86 which causes the first fuel pump 83 to advance an amount of combustor fuel to the combustor 70. The amount of combustor fuel when combusted will produce the percentage of combustion products in the intake conduit 43 corresponding to the desired $NO_x$ level for the given engine speed and load.

The engine control unit 100 is further operable to generate fuel injector control signals which are sent to the fuel injector 88 via the signal line 90. The injector control signals control the timing and quantity of fuel injected by the fuel injector 88 into the combustion chamber 32.

Industrial Applicability

The engine assembly 10 operates in a four stroke cycle which includes an intake stroke, a compression stroke, a power stroke, and an exhaust stroke. During operation, the engine control unit 100 monitors the engine speed via signal line 99, inlet temperature via line 92, and inlet pressure via line 96. From the engine speed, inlet temperature and inlet pressure, the engine control unit 100 calculates the mass flow $\dot{m}$ and corresponding percentage of maximum load through the engine assembly 10.

Referring now to FIG. 2, if the engine control unit 100 determines that the engine speed is 1700 RPM and the mass flow $\dot{m}$ through the engine assembly 10 corresponds to 50% load, then the $NO_x$ production of the engine assembly 10 corresponds to the line 106. If it is desired to meet the 1998 United States on highway $NO_x$ standard, then the desired combustion products rate corresponds to the point 115, or about 1% of the volume of the air in the intake conduit 43.

On the other hand, if it is desired to meet the 2004 United States on highway $NO_x$ standard, then the desired combustion products rate corresponds to the point 117, or about 11.5% of the flow of air in the intake conduit 43.

Once the engine control unit 100 determines the percentage of combustion products required in the intake conduit 43, the engine control unit 100 generates a fuel control signal on the signal line 86 which causes the first fuel pump 83 to inject the amount of combustor fuel to the combustor 70. If the calculated $NO_x$ content is greater than the desired content, then the fuel control signal causes more combustor fuel to be injected into the combustor 70. Conversely, if the calculated $NO_x$ content is less than the desired content, then the fuel control signal causes less combustor fuel to be injected into the combustor 70.

In addition, the engine control unit 100 generates an ignition signal on the signal line 78 which causes the ignitor 76 to ignite the air and combustor fuel present in the combustor 70. It should be appreciated that by combusting the amount of combustor fuel in the combustor 70, combustion products are generated in the combustor 70 and advanced to the combustion chamber 32 via the intake conduit 43. The percentage of combustion products in the intake conduit 43 correspond to the desired $NO_x$ level shown in FIG. 2.

Prior to reaching the combustion chamber 32, the air and combustion products in the intake conduit 43 are cooled in the heat exchanger 80. Cooling of the air and combustion products increases the efficiency of the engine assembly 10.

During the intake stroke, the exhaust valve 56 is positioned in the closed position (not shown) and the intake valve 50 is positioned in the open position. The piston 20 advances downwardly in the general direction of arrow 22 thereby creating a low pressure in the combustion chamber 32. This low pressure draws the air and combustion products from the intake conduit 43 into the combustion chamber 32.

Advancing to the compression stroke, the intake valve 50 and the exhaust valve 70 are both positioned in their respective closed positions. As the piston 20 moves upwardly in the general direction of arrow 24, the piston 20 compresses the air and combustion products in the combustion chamber 32. The compression of the air and combustion products in the combustion chamber 32 greatly increases the temperature in the combustion chamber 32. Near the end of the compression stroke, the engine control unit 100 generates a fuel injector control signal on the signal line 90 which causes the fuel injector 88 to inject diesel fuel into the combustion chamber 32. The injection of the diesel fuel into the heated air and combustion products present in the combustion chamber 32 causes the diesel fuel to ignite.

The presence of the combustion products from the combustor 70 inhibits the formation of $NO_x$ in the combustion chamber 32. In particular, the combustion products act as an inert mass which reduces the temperature rise in the combustion chamber 32 as the diesel fuel is combusted. Decreasing the temperature in the combustion chamber reduces the amount of $NO_x$ produced during the combustion of the diesel fuel. It should be noted from FIG. 2 that as the amount of combustion products is increases, $NO_x$ production decreases whereas as the amount of combustion products decreases, $NO_x$ production increases.

Advancing to the power stroke, the intake valve 50 and the exhaust valve 56 are both positioned in their respective closed positions. The combustion of the diesel fuel and air in the combustion chamber 32 causes formation of exhaust gases. The formation of exhaust gases generates heat and pressure which acts upon the piston 20 to drive the piston 20 in the general direction of arrow 22. Movement of the piston 20 in the general direction of arrow 22 causes the crankshaft 28 to rotate in the general direction of arrow 30.

Thereafter, the engine assembly 10 advances to the exhaust stroke. During the exhaust stroke, the exhaust valve is positioned in the open position and the intake valve 50 is positioned in the closed position. As the piston 20 advances from the position shown in FIG. 1 in the general direction of arrow 24, the piston 20 forces exhaust gases past the open exhaust valve 56 and into the exhaust passage 44 and exhaust conduit 48.

It should be appreciated that the exhaust gases in the exhaust conduit 48 should have the desired $NO_x$ content level. The engine assembly 10 produces exhaust gases with the desired $NO_x$ content because the engine control unit 100 causes the combustor 70 to combust the amount of combustor fuel necessary to place the required percentage of combustion products in the intake conduit 43 that corresponds to the desired $NO_x$ content shown in FIG. 2. It should further be appreciated that the $NO_x$ levels in FIG. 2 are predetermined for a particular engine assembly 10 operating at a given speed and load. In this case, the exemplary engine is running at 1700 RPM at 50% load.

Producing combustion products with the combustor 70 allows combustion products to be advanced to the combustion chamber 32 under all operating conditions. Conventional EGR systems cannot advance exhaust gases from the exhaust conduit 48 to the intake conduit 43 when the pressure in the intake conduit 43 is greater than the pressure in the exhaust conduit 48. The combustor 70 can be operated at any operating condition of the engine assembly 10, including operating conditions where the pressure in the exhaust conduit 48 is less than the pressure in the intake conduit 43. This allows combustion products to be advanced from the combustor 70 to the combustion chamber 32 when the pressure in the intake conduit 43 is greater than the pressure in the exhaust conduit 48.

Moreover, the continuous combustion of combustor fuel in the combustor 70 produces combustion products with less soot and smoke than the exhaust gases produced by the intermittent combustion of diesel fuel in the combustion chamber 32. Therefore, the combustion products advanced from the combustor 70 to the combustion chamber 32 are cleaner than exhaust gases present in the exhaust conduit 48. The cleaner combustion products are less likely to foul the intake manifold 42, combustion chamber 32, and the valves 50, 56 of the engine assembly 10. Such reduced fouling of the components of the engine assembly 10 may potentially increase the useful life and performance of the engine assembly 10.

In addition to reducing $NO_x$ production, the present invention can also be used to heat air in the intake conduit 43 during a cold startup condition. During startup of the engine assembly 10, if the engine control unit 100 receives a temperature signal from the temperature sensor 91 via the signal line 92 indicating that a temperature value in the intake conduit 43 that is below a predetermined cold start threshold level, the engine control unit 100 determines that a cold startup condition exists. In response to determining that a cold startup condition exists, the engine control unit 100 generates a cold start fuel control signal on signal line 86. The cold start fuel control signal causes a predetermined amount of combustor fuel to be advanced to the combustor 70. In addition, an ignition signal is sent to the ignitor 76 to ignite the combustor fuel in the combustor 70. Ignition of the combustor fuel in the combustor 70 generates heat in the intake conduit 43.

The heat generated by combusting combustor fuel in the combustor 70 heats the air in the intake conduit 43 before the air is advanced to the combustion chamber 32. During an intake stroke, this heated air is advanced to the combustion chamber 32 thereby increasing the temperature of the air in the combustion chamber 32 prior to the compression stroke. During the compression stroke, the compression of the air within the combustion chamber 32 adds additional heat to heated air present in the combustion chamber 32 thereby increasing the temperature in the combustion chamber 32 beyond the temperature level that could be generated by compressing unheated air. Increasing the temperature in the combustion chamber 32 increases the likelihood that the diesel fuel will ignite during cold startup conditions.

The process of combusting combustion fuel in the combustor 70 to heat air in the intake conduit 43 is continued for a predetermined period of time or until the temperature sensor 91 returns a temperature signal to the engine control unit 100 that indicates that a cold startup condition no longer exists. It should be appreciated that this method of increasing the temperature in the combustion chamber 32 during the cold startup condition requires only the equipment already present in an engine assembly 10 to control the production of $NO_x$.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

For example, although the temperature sensor 91, the pressure sensor 94, and the speed sensor 98 are described herein to calculate the mass flow through the engine assembly 10, and have significant advantages thereby in the present invention, a mass flow sensor, such as a hot wire anemometer, could be positioned in the intake conduit 43 to measure the mass flow through the engine assembly 10.

What is claimed is:

1. An engine assembly having a combustion chamber defined therein, comprising:
    a controller which (i) determines a desired level of $NO_x$ for exhaust gases exiting said combustion chamber, wherein said desired level of $NO_x$ in exhaust gases exiting said combustion chamber is established by a predetermined standard, and (ii) generates a fuel control signal in response to determining the desired level of $NO_x$;
    a combustor operable to combust an amount of combustor fuel to produce combustion products in response to generation of said fuel control signal, wherein combustion products are advanced to said combustion chamber during an intake stroke of the engine assembly; and
    a fuel injector operable to inject diesel fuel into said combustion chamber during a compression stroke of said engine assembly,
    wherein a mixture of said diesel fuel and said combustion products is combusted within said combustion chamber during a power stroke whereby exhaust gases are produced.

2. The engine assembly of claim 1, further comprising:
    an intake conduit interposed between said combustor and said combustion chamber;
    a crankshaft;
    a speed sensor which measures speed of said crankshaft and generates a speed signal in response thereto;
    a pressure sensor operable to measure pressure in said intake conduit and generate a pressure signal in response thereto; and
    a temperature sensor operable to measure temperature in said intake conduit and generate a temperature signal in response thereto,
    wherein said fuel control signal is based on said temperature signal, said pressure signal, and said speed signal.

3. The engine assembly of claim 2, wherein:
    said controller calculates $NO_x$ content of exhaust gases exiting said combustion chamber based on said temperature signal, said pressure signal, and said speed signal,
    said fuel control signal causes more combustor fuel to be combusted in said combustor if said $NO_x$ content is greater than said desired level of $NO_x$, and
    said fuel control signal causes less combustor fuel to be combusted in said combustor if said $NO_x$ content is less than said desired level of $NO_x$.

4. The engine assembly of claim 1, further comprising (i) a first fuel pump operable to supply combustor fuel to said combustor in response to receiving said fuel control signal, and (ii) a second fuel pump operable to supply diesel fuel to said fuel injector, wherein:
    said first pump supplies combustor fuel to said combustor in response to receiving said fuel control signal, and
    said second pump supplies diesel fuel to said combustion chamber.

5. The engine assembly of claim 4, further comprising a reservoir of diesel fuel, wherein:
    said first pump draws diesel fuel from said reservoir and supplies diesel fuel to said combustor, and
    said second pump draws diesel fuel from said reservoir and supplies diesel fuel to said fuel injector.

6. The engine assembly of claim 1, further comprising (i) an intake conduit interposed between said combustor and said combustion chamber, and (ii) a heat exchanger positioned within said intake conduit,
    wherein said combustion products are cooled in said heat exchanger prior to being combusted in said combustion chamber.

7. The engine assembly of claim 1, wherein:
    said controller senses a cold startup condition and generates a cold startup fuel control signal in response thereto,
    combustor fuel is combusted in said combustor to generate combustion products in response to said cold startup fuel control signal, and
    said combustion products heat said combustion chamber.

8. The engine assembly of claim 7, further comprising (i) an intake conduit interposed between said combustor and said combustion chamber, and (ii) a temperature sensor positioned in said intake conduit and operable to generate a temperature signal,
    wherein said controller generates said cold startup fuel control signal if said temperature signal corresponds to an intake conduit temperature value which is less than a predetermined cold start temperature value.

9. A method of operating a diesel engine assembly having a combustion chamber, comprising the steps of:
    determining a desired level of $NO_x$ for exhaust gases exiting the combustion chamber, wherein the desired level of $NO_x$ in exhaust gases exiting the combustion chamber is established by a predetermined standard, and generating a fuel control signal in response to determining the desired level of $NO_x$;

injection an amount of combustor fuel in the combustor so as to produce combustion products;

advancing the combustion products into to combustion chamber during an intake stroke of the diesel engine;

injecting diesel fuel with a fuel injector into the combustion chamber while the combustion products are located in the combustion chamber during a compression stroke; and combusting a mixture of the diesel fuel and the combustion products so as to produce exhaust gases during a power stroke.

10. The method of claim 9, wherein:

an intake conduit is interposed between the combustor and the combustion chamber, the diesel engine assembly further includes a crankshaft, and the determining step includes the steps of (i) sensing temperature in the intake conduit and generating a temperature signal in response thereto, (ii) sensing pressure in the intake conduit and generating a pressure signal in response thereto, (iii) sensing speed of the crankshaft and generating a speed signal in response thereto, and (iv) generating the fuel control signal based on the temperature signal, the pressure signal, and the speed signal.

11. The method of claim 10, wherein:

the determining step includes the step of calculating $NO_x$ content of exhaust gases based on a predetermined relationship between (i) the $NO_x$ content of exhaust gases in the exhaust conduit, and (ii) the temperature signal, the pressure signal, and the speed signal, the fuel control signal causes more combustor fuel to be injected into the combustor if the $NO_x$ content is greater than the desired level of $NO_x$, and the fuel control signal causes less combustor fuel to be injected into the combustor if the $NO_x$ content is less than the desired level of $NO_x$.

12. The method of claim 9, wherein:

the engine assembly further includes (i) a first fuel pump operable to supply combustor fuel to the combustor and (ii) a second fuel pump operable to supply diesel fuel to the fuel injector, the injecting combustor fuel step includes the step of supplying the amount of combustor fuel to the combustor with the first pump in response to receiving the fuel control signal, and the injecting diesel fuel step includes the step of supplying diesel fuel to the fuel injector with the second pump.

13. The method of claim 12, wherein:

the engine assembly includes a reservoir of diesel fuel, the injecting combustor fuel step includes the step of drawing diesel fuel from the reservoir with the first pump and injecting diesel fuel into the combustor, and the injecting diesel fuel step includes the step of drawing diesel fuel from the reservoir with the second pump and injecting diesel fuel into the combustion chamber.

14. The method of claim 9, wherein (i) an intake conduit is interposed between the combustor and the combustion chamber, and (ii) a heat exchanger is positioned within the intake conduit, further comprising the step of:

cooling the combustion products with the heat exchanger prior to the advancing step.

15. The method of claim 9, further comprising the steps of:

sensing a cold startup condition and generating a cold startup fuel control signal in response thereto; injecting combustor fuel into the combustor in response to the cold startup fuel control signal; and combusting combustor fuel in the combustor so as to heat the combustion chamber during the advancing step.

16. The method of claim 15, wherein:

an intake conduit is interposed between the combustor and the combustion chamber, a temperature sensor is positioned in an intake conduit and operable to generate a temperature signal, and the sensing step includes the step of generating the cold startup fuel control signal if the temperature signal corresponds to an intake conduit temperature value which is less than a predetermined cold start temperature value.

* * * * *